Nov. 19, 1974
M. J. ESTREM
ADJUSTABLE TIMER HAVING ROTATING CAM AND WIDE RANGE VARIABLE DWELL
Re. 28, 249
Original Filed Oct. 13, 1969
3 Sheets-Sheet 1
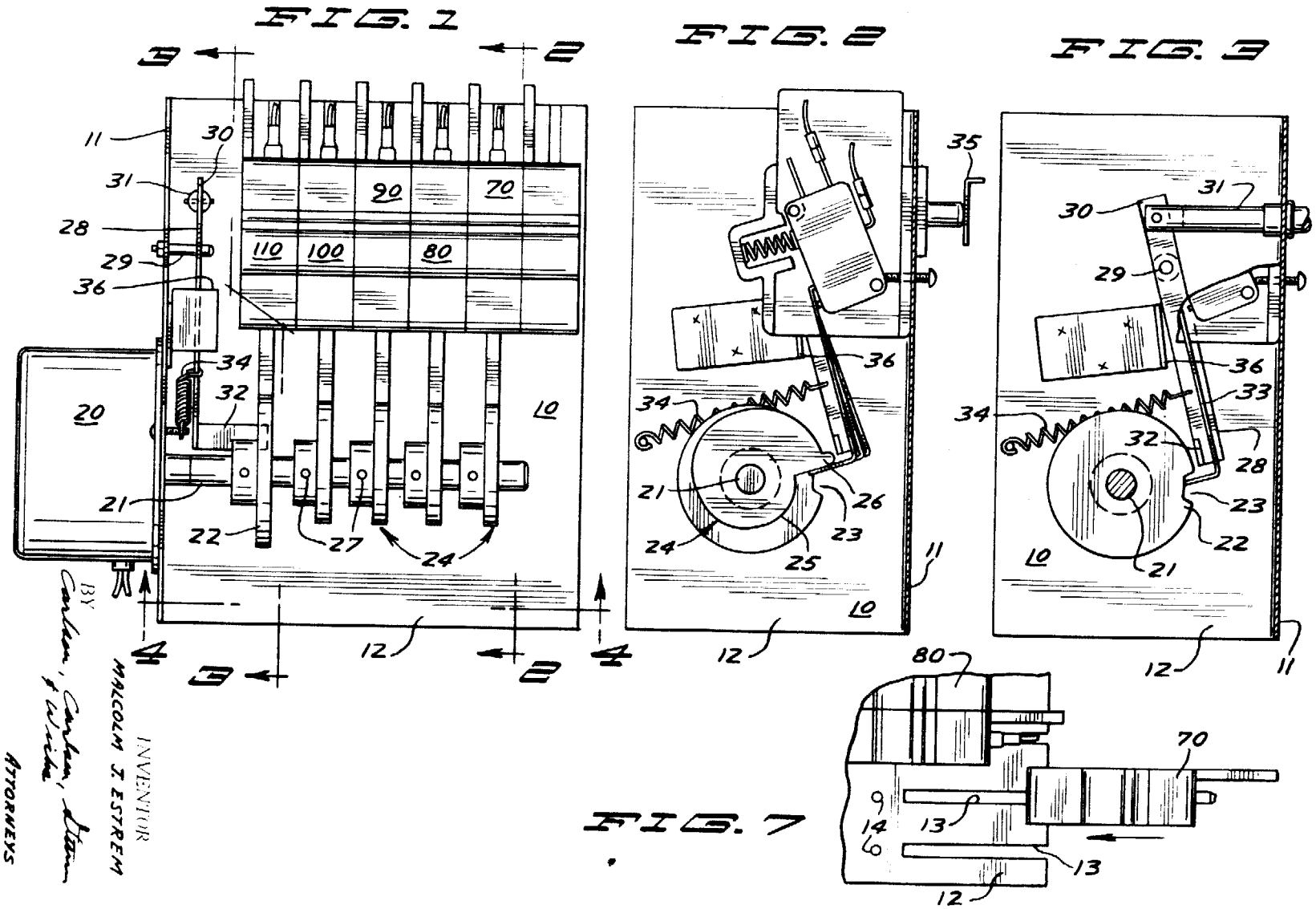
INVENTOR
MALCOLM J. ESTREM
BY Carlson, Carlson, Steen & Wicks
ATTORNEYS

INVENTOR.
MALCOLM J. ESTREM

BY

Carlson, Carlson, Burman & Wicks

ATTORNEYS

INVENTOR
MALCOLM J. ESTREM
BY Carlson, Carlson, Sturm & Ziesche
ATTORNEYS

United States Patent Office

Re. 28,249
Reissued Nov. 19, 1974

28,249

ADJUSTABLE TIMER HAVING ROTATING CAM AND WIDE RANGE VARIABLE DWELL

Malcolm J. Estrem, Edina, Minn., by The Cornelius Company, Anoka, Minn., assignee Original No. 3,670,128, dated June 13, 1972, Ser. No. 865,904, Oct. 13, 1969, which is a division of application Ser. No. 795,389, Jan. 2, 1969, which is a continuation-in-part of application Ser. No. 696,673, Dec. 11, 1967, both now abandoned. Application for reissue Nov. 23, 1973, Ser. No. 418,301

Int. Cl. H01h *3/42, 43/10*

U.S. Cl. 200—153 LB 17 Claims

Matter enclosed in heavy brackets [ ] appears in the original patent but forms no part of this reissue specification; matter printed in italics indicates the additions made by reissue.

ABSTRACT OF THE DISCLOSURE

Adjustable timing apparatus for actuating individual switch contact assemblies at various predetermined times during the cycle of rotation of a shaft including a plurality of cams characterized by the inclusion of a peripheral involute actuating surface which further includes a switch contact resetting portion. Individual switch contact assemblies are removably disposed in operative position adjacent to a cam whereby a cam follower type of switch contact actuator is biased into adjustable continuous contact with the peripheral surface of each of the cams. Means are provided for effecting rotation of the shaft, upon which the cams are disposed, at a predetermined substantially constant rotational velocity. Further means are provided to be responsive to tokens supplied thereto for controlling and initiating the operation of the timing apparatus. A suitable slot adapted to receive tokens is provided with a removable stop for arresting the motion of a coin and further means are provided for generating a signal in response to the presence of the token. The signal is utilized to initiate operation of the timer. Prior to the end of the timing cycle of operation, the removable stop means is actuated to allow release of the token into a collection receptacle.

Division of Ser. No. 795,389, Jan. 2, 1969, abandoned. *A Continuation-In-Part of an earlier filed application in the name of Malcolm J. Estrem having Ser. No. 696,673, filed Dec. 11, 1967, for Adjustable Timer (now abandoned).*

This invention relates generally to timers and is particularly related to timers of the type that provide independent adjustment of individual switch contacts of a plurality of switching contact assemblies in which the switch contact assemblies may be readily adjusted for operation or actuation of a switch contact at a predetermined time.

The prior art is replete with various combinations of switch contact assemblies and timed actuating means so as to provide the opening or closing of switch contacts at a predetermined timed sequence. Example of such apparatus might include washing machines and dryers, machine tools and apparatus for vending articles or commodities of one type or another. Substantially all of the available timers illustrated by the prior art to which this invention pertains have utilized switching elements that may be operated by characterized timing devices which in substantially all applications are nonadjustable or may provide adjustability over a very small and limited range during an overall timing interval.

A further shortcoming of the prior art might be seen in the difficulty of replacing or adding various elements of the timer devices when such operations become necessary or desirable in, for example, replacing individual switch contact assemblies with others of different rating or the replacement of elements which may become defective under service conditions.

It is therefore, an object of my invention to provide an improved adjustable timer.

Another object of my invention is to provide an improved adjustable timer in which one or more of a plurality of switch contact assemblies may be easily, economically and adjustably replaced or added to an adjustable timer.

Another object of my invention is to provide an improved token responsive timing apparatus.

A still further object of my invention is to provide token responsive timing apparatus in which the operation thereof is initiated by the presence of a token and release means operated thereby to release the token prior to the end of a timing cycle.

Another object of my invention is to provide timing apparatus in which at least the initiation of operation is effected by a token responsive source of signal.

A still further object of my invention is to provide an adjustable timer which eliminates inaccuracies which normally result from the differential existing in switch contact assemblies upon the opening and/or closing thereof.

It is a still further object of my invention to provide switch contact assemblies for use on electrical timers which provide novel and improved mounting and adjustment of switch contacts contained therein for adjustably timed operation with respect to others of a plurality of like switch contact assemblies in relation to a shaft including an outer periphery of variable radius and which is adapted to rotate at a predetermined substantially constant velocity.

These and other objects of my invention will become apparent from a consideration of the appended specification, claims and drawings, in which FIG. 1 is a top plan view of an adjustable timing apparatus illustrating a preferred embodiment of my invention;

FIG. 2 is an end sectional view of the apparatus shown in FIG. 1 taken along section line 2—2;

FIG. 3 is an end actuating view of the apparatus shown in FIG. 1 taken along section line 3—3;

FIG. 7 is a fragmentary, partially exploded, top plan view of a portion of FIG. 1;

Figure 4:
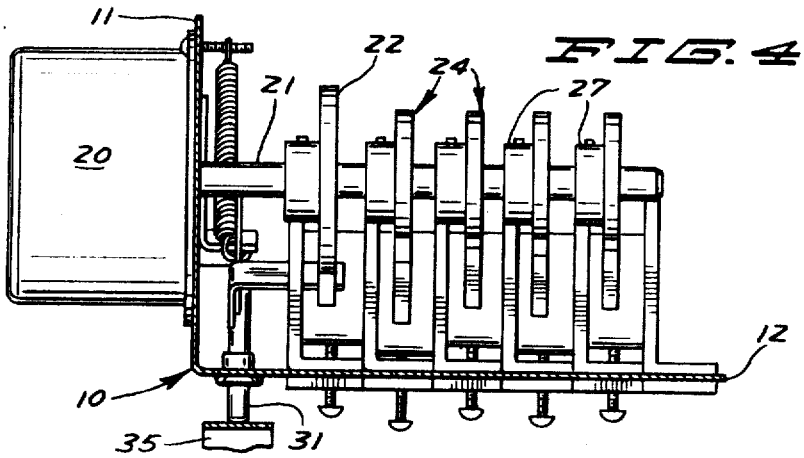
FIG. 4 is a front elevational sectional view of the apparatus shown in FIG. 1 taken along section line 4—4.
Figure 6:
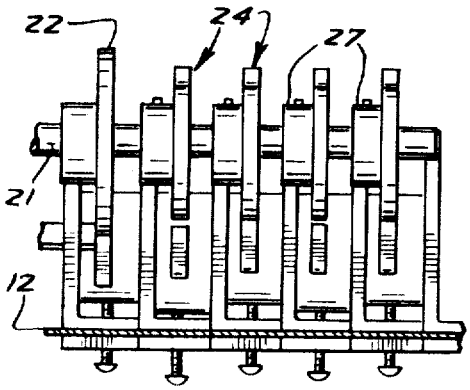
FIG. 6 is a front elevational fragmentary view of a portion of FIG. 4 with the elements shown in operative disposition during a portion of the cycle of operation of the apparatus shown in FIG. 1.

Referring now to the drawings, there is shown a base member 10 which may be comprised of suitable rigid material such as sheet steel, having an end portion 11 which is disposed substantially perpendicularly to a bottom portion 12. Bottom portion 12 is shown having a plurality of laterally disposed slots 13 at its rearward end for receiving a like plurality of switch housings 40 to be described in detail below.

Figure 5:
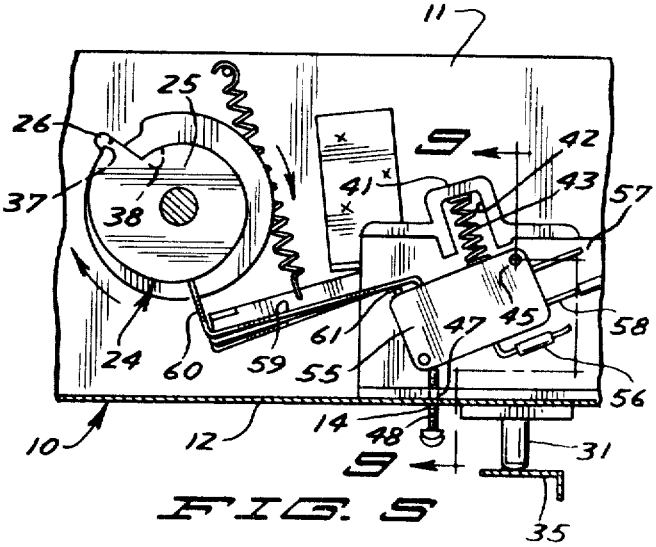
FIG. 5 is a fragmentary side elevational sectional view like that shown in FIG. 2 with the various portions of the apparatus of FIG. 1 shown in an intermediate point in the operation thereof.
Figure 9:
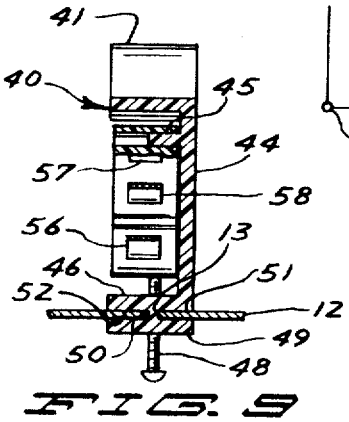
FIG. 9 is a sectional view of a portion of FIG. 5 taken along section line 9—9 on FIG. 5.

A synchronous timing motor 20 is shown suitably disposed and attached to the outside of end portion 11 on base member 10 near the forward end thereof and includes a shaft 21 which extends laterally of end portion 11 and generally parallel to the surface of bottom portion 12 of base member 10. A plurality of cam members are shown adjustably and nonrotatably disposed and in axially spaced relationship corresponding generally to the slots 13 disposed at the rearward end of base member 10. The cams include a first cam 22 having a periphery of substantially constant radius and a notch 23 disposed therein for purposes to be described below. Shaft 21 further includes a plurality of second cams each having a peripheral configuration comprised of an involute of constantly varying radius and including a laterally outwardly extending portion 26 extending for approximately ten angular degrees, which is disposed intermediate the portion of the involute peripheral surface of greatest radius and the portion of the involute peripheral surface of smaller radius. FIG. 5 shown in dotted outline, that the second cams may have a second configuration using an inwardly extending portion 38 and a straight peripheral portion 37. Motor 20 may be selected from any of the commercially available motors of the class which may or may not include suitable gear reduction means in combination with a synchronous electrical motor which are characterized by a substantially constant rotational velocity, when suitably energized from a source of electrical current or which might be capable of being driven from suitable mechanical devices providing a substantially constant rotational velocity.

A start lever 28 is shown rotatably disposed on the end of a pin member 29 extending laterally from the inner surface of end portion 11 and is adapted to rotate in a plane substantially perpendicular to the axis of rotation of shaft 21 on motor 20. Start level 28 has an actuating end 30 that is shown pivotally connected to a suitable plunger that extends through the bottom portion 12 of base member 10 at one end and a laterally extending portion 32 at the other end that is adapted to engage a cam follower arm 33 on a switch contact assembly 110. A further spring member 34 is shown disposed between start lever 28 and a pin extending inwardly of end portion 11 so as to bias start lever 28 in a direction toward shaft 21 on motor 20. A further stop means 36 is shown disposed extending laterally inwardly of end portion 11 and is adapted to engage start lever 28 to prevent over travel and to maintain it in a position for readiness for rapid actuation of switch arm 33 whenever push button 35 (FIG. 4) is depressed to initiate operation.

A plurality of switch contact assemblies 70, 80, 90, 100 and 110 are shown disposed and mounted upon and in the slots 13 at the rear end of bottom portion 12 of base member 10 and having cam follower members extending outwardly into continuous contact with the outer peripheries of the cam members disposed on shaft 21. Each of the plurality of switch contact assemblies is shown as being identical with the others and includes a switch housing 40 and a switch means 55. For the sake of simplicity, only one of the switch contact assemblies will be described in detail.

Referring to FIGS. 5, 6, 7 and 9 of the drawings, switch contact assembly 70 is shown including a switch housing 40 and a switching means 55, shown in the form of a miniature snap-acting switch which might be for example, a Microswitch, Micro Model V3L–1107–D8.

Switch housing 40 is shown having a side wall 44 of substantially uniform thickness, a laterally extending top portion 41 defining a recess 42 that is adapted to receive a spring member 43. Recess 42 is disposed at a slight angle with respect to the longitudinal axis of switch housing 40 and includes at its lower front end a portion that extends downwardly into the interior of switch housing 40 to serve as a stop member to form one extreme of the adjustment range of a switch means such as switch means 55. Adjacent to and slightly rearwardly of recess 42 there is shown a laterally extending pin 45 that is adapted to rotatably receive switch means 55 in the manner illustrated. Switch housing 40 is further shown with a laterally extending bottom wall 46 that is provided with a threaded aperture 47 which is adapted to receive an adjusting screw 48 which is shown passing through aperture 14 in bottom portion 12 of base member 10. Bottom portion 46 of switch housing 40 further includes a downwardly depending portion 49 that is attached to bottom wall 46 through a web portion 50 to define a pair of parallel longitudinally opposed grooves 51 and 52 to provide a means for removably engaging slots 13 in bottom portion 12 on base member 10.

Switch means 55 is shown having a common terminal 56, a normally open switching terminal 57 and a normally closed switching terminal 58. Switch means 55 further includes a lever arm 59 that is adapted to actuate push button 61 that in turn is operative upon displacement thereof to operate the switching contacts disposed within the housing of the switch means in a manner well known to those skilled in the art. Lever arm 59 is shown having a configuration at its forward free end that will allow it to continuously engage the outer periphery of a cam when switch housing 40 on switch contact assembly 70 is disposed substantially in the plane of rotation of a cam mounted on shaft 21.

Figure 8:
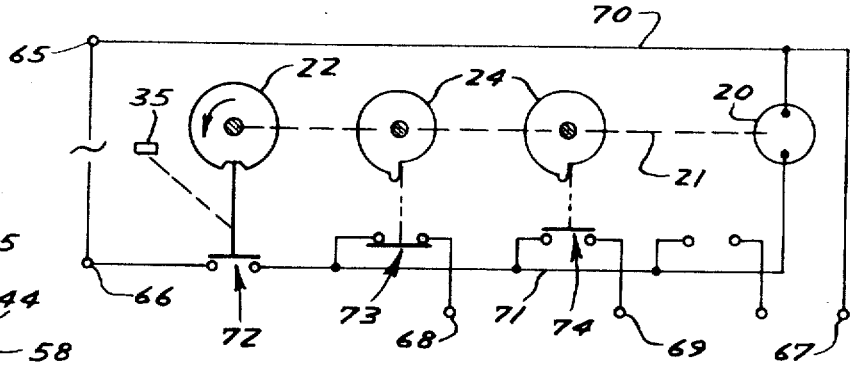
FIG. 8 is an electrical diagrammatic and schematic drawing of the apparatus shown in FIG. 1.

Referring now to the diagrammatic and schematic drawings shown in FIG. 8, a pair of input terminals 65 and 66 are shown adapted for connection to a suitable source of alternating current. Terminal 65 is connected to a common output terminal 67 through conductor 70 which is also connected to one terminal of motor 20. Terminal 66 is connected to the other terminal on motor 20 through conductor 71 and normally open switch contacts 72. Motor shaft 21 is shown having a first cam member 22 and a plurality of second cam members 24 disposed for rotation therewith. A further normally closed switch contact 73 is disposed intermediate conductor 71 and output terminal 68 and another normally open switch contact 74 is disposed intermediate conductor 71 and output terminal 69. Each of the switch contacts 72, 73 and 74 are shown having suitable cam follower means extending into contact with the outer periphery of cams 22 and 24 for actuation thereby and the driving means be of the form illustrated above as lever arm 59 on switch means 55 or other suitable forms of cam follower driving connections. Switch contact 72 is further provided with driving means connected to push button 35 which may provide for manual initiation of the start of a timing cycle by closing contacts 72 and completing a circuit to motor 20 to cause it to rotate for, in the embodiment shown, a single revolution as provided by the interaction of the driving means connected to contacts 72 and engagement with the outer periphery of cam 22 such that when a single revolution has been completed, contacts 72 are allowed to open and the timer is thus ready for the next cycle of operation.

OPERATION

In operation, motor 20 is initially energized from a source of external signal such as push button 35 or other suitable means which may be, for example, a solenoid or the like. Upon actuation of lever 28 to actuate lever arm 33 to close contact 72 in switch contact assembly 110, motor 21 is energized from input terminals 65 and 66 and will continue to operate for one revolution as determined by notch 23 in first cam member 22 and the lever arm cam follower attached to the switching means disposed in switch contact assembly 110. Switch contact assembly 110, first cam member 22, start lever 28 and the associated elements comprise a control means for motor 20 and shaft 21 to effect a single revolution of shaft 21 for each cycle of operation.

At the start of a cycle of operation, as shaft 21 begins to rotate, the ends 60 of lever arms 59 in each of the switch means 55 disposed in switch contact assemblies 70, 80, 90 and 100 are each moved radially outwardly for a substantial distance as provided by the "bump" 26 on second cam members 24 to provide a resetting of the switch means in each of the switch contact assemblies to eliminate the differential in switching operation that is present in all switch contacts of the general class shown. As shaft 21 continues rotation the ends 60 on lever arms 59 move radially inwardly toward shaft 21 and at some point during rotation of shaft 21, the position of lever arms 59 will be such as to actuate the contacts contained in the individual switch means 55. The point at which this occurs during a cycle of revolution of shaft 21 is determined by the angular disposition of switch means 55 about pin 45 in each of the switch housings 40 of the individual switch contact assemblies.

When it is desired to replace any individual switch contact assembly, an entire assembly may be removed without disturbing any of the other assemblies with respect to the timing cycle. This is done by merely removing the adjusting screw 48 for the particular switch contact assembly and sliding the assembly rearwardly out of engagement with slots 13 in bottom portion 12 of base member 10.

Adjustment screws 48 may also be calibrated and rendered accessible to, for example, the user of a coffee vending machine to provide a regulation of the amount of ingredients to be dispensed.

Where it is desired to actuate switch contacts having an operational differential in a direction opposite to that described above, second cams having the configuration shown in dotted outline as indicated by reference characters 37 and 38 (FIG. 5) may be utilized. The relative direction of rotation of the second cam is, of course, determined by the particular application of the principles of my invention.

Figure 10:
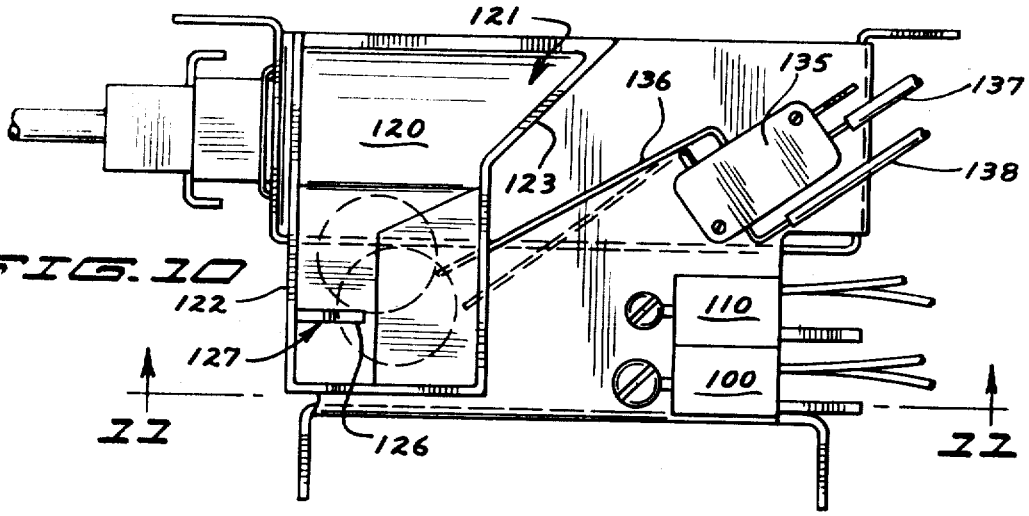
FIG. 10 is a plan elevation view of timing apparatus embodying the principles of my invention and which is intended to be operated in response to the application of tokens, as in many vending machine applications.
Figure 11:
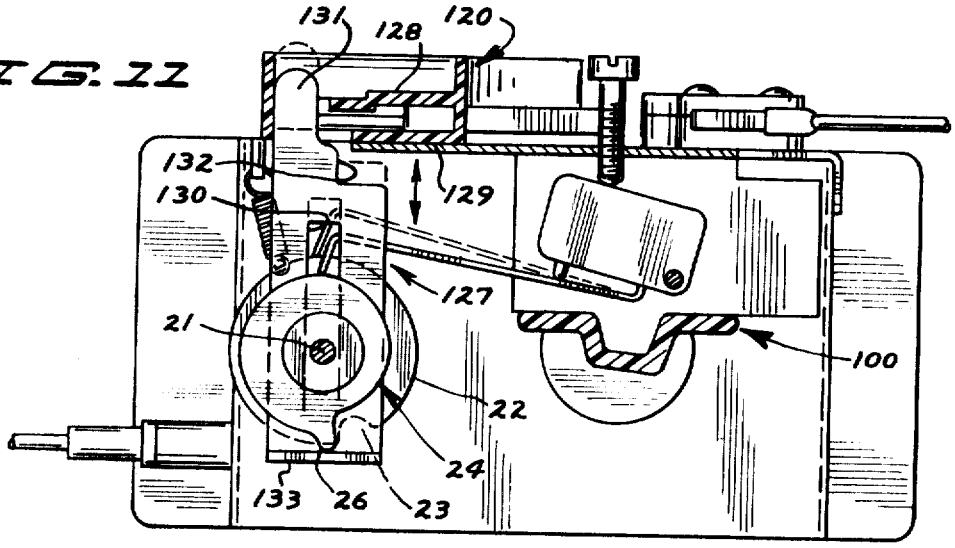
FIG. 11 is a sectional view of a portion of FIG. 10 taken along section line 11—11.
Figure 12:
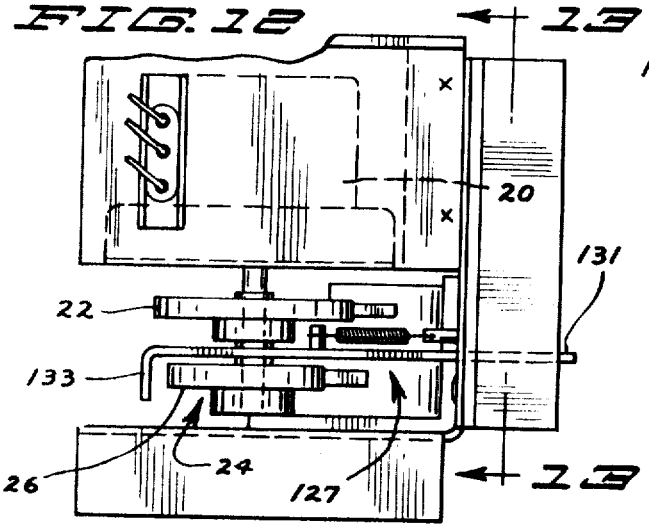
FIG. 12 is an end elevational view of FIG. 10 looking toward the left end.
Figure 13:
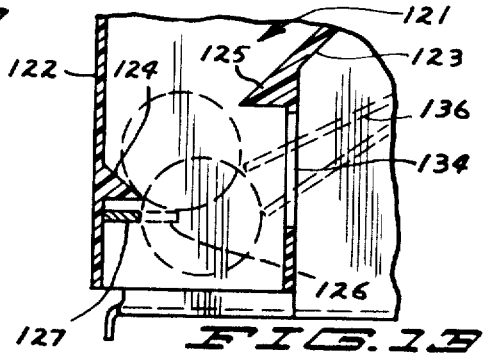
FIG. 13 is a sectional view of a portion of the apparatus shown in FIGS. 10, 11 and 12 taken along section line 13—13 on FIG. 12.

Referring to FIGS. 10, 12, 12 and 13 of the drawings, another embodiment of my invention is shown comprising the same motor 20, shaft 21, cam members 22 and 24 and switching devices 100 and 110 as described above in connection with the embodiment.

As illustrated in FIGS. 10–13, the timing apparatus is comprised of a frame indicated generally by reference character 139 upon which the various elements are disposed in the manner shown. Motor 20 is suitably mounted for carrying rotatable shaft 21 which in turn supports cam members 22 and 24, each having notches or resetting means 23 and 26 respectively, for use substantially in the manner described above. Switch contact assemblies 100 and 110 are each provided with actuators extending into proximity with the periphery of cam members 22 and 24 for actuation thereby and, each may also include suitable adjusting means for adjustably disposing the switch members operable by the switch actuator members so as to control actuation thereof at any desired portion of a cycle of operation of the timing apparatus.

A token receiving member, mounted at one end of frame 139, is indicated generally by reference character 120 and includes an enlarged, flared top 121, a pair of side walls 122 and 123 upon which suitable guide portions 124 and 125 are disposed, a stop slot 126 and end walls 128 and 129. A token stop 127 is shown extending through stop slot 126 and further includes a slot 130 adapted to be slidably disposed on shaft 21, a narrow outer end portion 131 and a somewhat wider intermediate portion 132. Stop member 127 further includes an L-shaped extension 133 at its inner end, shown to be adapted to be engaged by outwardly extending reset portion 26 on cam member 24. Token receiving member 120 further includes a longitudinal extending slot portion 132 in side member 123.

An actuator 136 on switch 135 extends through slot 134 to be engaged by a token when present in token receiving means 120. Switch 135 may be operably connected by a pair of conductors 137 and 138 to, for example, the stationary contacts on switch contact assembly 72 as shown on FIG. 8 of the drawings. From a consideration of the schematic drawing of FIG. 8 it will become apparent to those skilled in the art that switch 135 through movement of actuator 136 in response to a token, motor 20 will be energized to initiate operation of the timing apparatus.

OPERATION

In operation, the apparatus may be assumed to be in the position shown in solid outline in FIG. 10 of the drawings with the exception that stop member 127 will be in its outermost position with intermediate portion 132 extending through slot 126 in taken receiving means 120. A token may be applied to the upper end of token receiving means 120 and will be suitably positioned by guide members 125 and 124 so that it will ultimately come to rest with one end against actuator arm 136 to thereby actuate or operate switch 135 and the other end in engagement with intermediate portion 132 on stop member 127 to be held thereby. As stated above, energization of switch 135 serves to initiate operation of motor 20 to rotate shaft 21 and cam members 22 and 24. Cam member 22, as was described above, is adapted to provide a single revolution of shaft 21 in response to a signal.

In the embodiment shown in FIGS. 10–13 of the drawings, cam member 24, having an outwardly extending resetting portion 26, is utilized to effect a release of the token that is held stationary in token receiving means 120 by stop means 127. At an intermediate portion of the cycle, in the apparatus shown in the drawings, cam resetting portion 26 will engage the L-shaped laterally extending portion 123 on stop member 127 and retract stop member 127 into housing 139 to provide a slot size in token receiving means 120 that yill allow a token to pass through adjacent to end portion 131 of stop member 127.

It is anticipated that a cycle of operation of the timing apparatus may be controlled entirely through the use of tokens and that in some applications it may be desirable to eliminate cam 22 and switch apparatus 110.

Having now therefore fully illustrated and described my invention, what I claim to be new and desire to protect by Letters Patent is:

1. Adjustable timing apparatus having variable dwell switching comprising in combination;

a. a rotatable shaft;

b. at least one cam means mounted on said shaft for rotation therewith, said cam means having a peripheral surface including a substantial circumferentially elongated portion of constantly varying radius and a short circumferentially and radially extending switch resetting means for non-constantly varying radius disposed intermediate the portions of largest and smallest radius on said substantial circumferentially elongated portion said last named means being operable to reset a switch contact assembly subsequent to actuation thereof;

c. means operable to rotate said shaft;

d. at least one spring switch contact assembly having a normal deactuated position, and an actuated position, and including a cam follower in engagement with the peripheral surface of said cam, said cam follower being operable to actuate said switch contact assembly at a predetermined radial position of said cam and said shaft and to reset and deactuate said switch contact assembly by said resetting means causing said switch contact assembly to move past its normal deactuated position before allowing the switch contact assembly to assume its normal deactuated position in response to engagement with said switch resetting means whereby said switch contact assembly may be successively, repeatably actuated at the same angular position of said shaft and said cam as rotation thereof is effected.

2. The apparatus of claim 1 in which the resetting means includes a portion of a radius that is larger than the largest radius of the cam means.

3. The apparatus of claim 1 in which the resetting means includes a portion having a radius that is smaller than the smallest radius of the cam means.

4. The apparatus of claim 1 in which the shaft is operable at a constant velocity.

5. The apparatus of claim 2 in which the shaft is operable at a constant velocity.

6. The apparatus of claim 3 in which the shaft is operable at a constant velocity.

7. The apparatus of claim 1 in which the means operable to rotate the shaft includes means for rotating said shaft for one revolution only.

8. The apparatus of claim 2 in which the means operable to rotate the shaft includes means for rotating shaft for one revolution only.

9. The apparatus of claim 3 in which the means operable to rotate the shaft includes means for rotating said shaft for one revolution only.

10. The apparatus of claim 1 in which the switch contact assembly and cam follower are adjustable circumferentially of the shaft and cam.

11. The apparatus of claim 1 in which the switch contact assembly and the cam follower are adjustable radially of said shaft and said cam.

12. The apparatus of claim 11 in which the switch contact assembly and the cam follower are rotatably adjustable about an axis parallel to the axis of the shaft and the cam.

13. The apparatus of claim 1 in which the shaft and the switch contact assembly are disposed on a base member.

14. The apparatus of claim 13 in which th switch contact assembly is disposed in a further removable base member.

15. The apparatus of claim 14 in which the further base includes a groove and the base member includes a slot adapted to receive the grooved portion of said further base member.

16. The subject matter of claim 14 in which the switch contact assembly is rotatably disposed within the further base member and the further base member includes means for rotatably adjusting said switch contact assembly.

17. The apparatus of claim 16 in which spring biasing means are disposed between the switch contact assembly and one wall of the further base and adjusting means extend through another wall of the further base into engagement with the switch contact assembly.

References Cited

The following references, cited by the Examiner, are of record in the patented file of this patent or the original patent.

UNITED STATES PATENTS

| | | | |
|---|---|---|---|
| 909,253 | 1/1909 | Symonds et al. | 194—9 T |
| 2,551,730 | 5/1951 | Del Sol | 194—9 T |
| 2,716,163 | 8/1955 | Smith | 200—153 T |
| 2,803,718 | 8/1957 | Bloom et al. | 200—82 C |
| 2,817,725 | 12/1957 | Rochfort et al. | 200—153 T |
| 2,853,567 | 9/1958 | Kock | 200—31 R |
| 3,160,719 | 12/1964 | Seidel | 200—31 R X |

JAMES R. SCOTT, Primary Examiner

U.S. Cl. X.R.

200—31 R, 38 F, 38 BA, 153 T